(12) United States Patent
Kuroda

(10) Patent No.: US 9,049,428 B2
(45) Date of Patent: Jun. 2, 2015

(54) IMAGE GENERATION SYSTEM, IMAGE GENERATION METHOD, AND INFORMATION STORAGE MEDIUM

(75) Inventor: Yosuke Kuroda, Yokohama (JP)

(73) Assignee: BANDAI NAMCO GAMES INC., Tokyo (JP)

( * ) Notice: Subject to any disclaimer, the term of this patent is extended or adjusted under 35 U.S.C. 154(b) by 695 days.

(21) Appl. No.: 13/227,129

(22) Filed: Sep. 7, 2011

(65) Prior Publication Data

US 2012/0056992 A1 Mar. 8, 2012

(30) Foreign Application Priority Data

Sep. 8, 2010 (JP) ................................. 2010-200905

(51) Int. Cl.
*H04N 13/02* (2006.01)
*H04N 13/00* (2006.01)
*G06T 19/00* (2011.01)
*G06T 7/00* (2006.01)

(52) U.S. Cl.
CPC ............ *H04N 13/004* (2013.01); *G06T 19/006* (2013.01); *H04N 2013/0081* (2013.01); *G06T 7/0042* (2013.01); *G06T 2207/10021* (2013.01); *G06T 2207/30204* (2013.01)

(58) Field of Classification Search
CPC ....... A63F 13/10; A63F 13/00; G06T 7/2046; G06T 15/00; G06T 19/006; G06T 2207/10021; G06T 2207/30204; G06T 7/0042; G06F 3/011; G06F 3/033; H04N 13/004; H04N 13/0081
USPC .......................................................... 348/46
See application file for complete search history.

(56) References Cited

U.S. PATENT DOCUMENTS

| 8,588,465 | B2* | 11/2013 | Geiss ............................. 382/103 |
| 2002/0158888 | A1* | 10/2002 | Kitsutaka ...................... 345/629 |
| 2005/0001835 | A1* | 1/2005 | Miura et al. .................. 345/426 |
| 2006/0170652 | A1* | 8/2006 | Bannai et al. ................. 345/156 |
| 2010/0208033 | A1* | 8/2010 | Edge et al. ...................... 348/46 |
| 2011/0025689 | A1* | 2/2011 | Perez et al. .................... 345/420 |
| 2012/0162378 | A1* | 6/2012 | El Dokor et al. ............... 348/46 |

FOREIGN PATENT DOCUMENTS

| JP | A-2000-341721 | 12/2000 |
| JP | A-2004-145448 | 5/2004 |
| JP | A-2010-170316 | 8/2010 |

OTHER PUBLICATIONS

Masayuki Kanbara (2010), Augmented Reality, *Information Processing*, Information Processing Society of Japan, vol. 51, No. 4, Whole No. 542, pp. 367-372 (with partial English translation).

* cited by examiner

*Primary Examiner* — Jessica M Prince
(74) *Attorney, Agent, or Firm* — Oliff PLC

(57) ABSTRACT

An image generation system includes a captured image acquisition section that acquires a captured image captured by an imaging section, a depth information acquisition section that acquires depth information about a photographic object observed within the captured image, an object processing section that performs a process that determines a positional relationship between the photographic object and a virtual object in a depth direction based on the acquired depth information, and synthesizes the virtual object with the captured image, and an image generation section that generates an image in which the virtual object is synthesized with the captured image.

18 Claims, 17 Drawing Sheets

PARALLAX: SMALL
DEPTH VALUE: SMALL

PARALLAX: MEDIUM
DEPTH VALUE: MEDIUM

PARALLAX: LARGE
DEPTH VALUE: LARGE

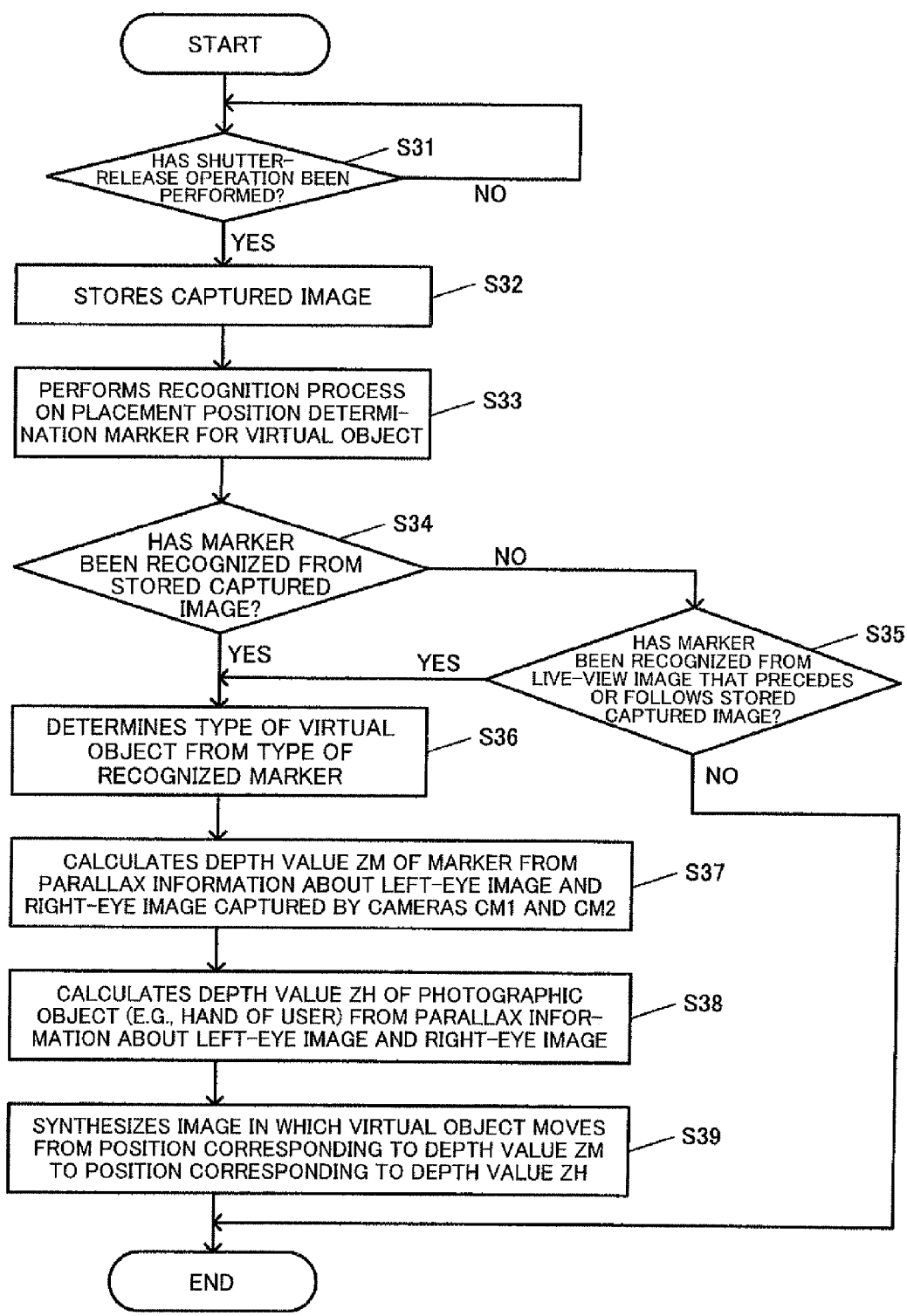

IMAGE GENERATION SYSTEM, IMAGE GENERATION METHOD, AND INFORMATION STORAGE MEDIUM

Japanese Patent Application No. 2010-200905 filed on Sep. 8, 2010, is hereby incorporated by reference in its entirety.

BACKGROUND

The present invention relates to an image generation system, an image generation method, an information storage medium, and the like.

In recent years, augmented reality (AR) technology has attracted attention as technology that adds information to the real world using a computer. The augmented reality (AR) technology synthesizes a virtual object with part of the actual environment as additional information. For example, JP-A-2010-170316 discloses related-art augmented reality technology. In JP-A-2010-170316, the state of the real world in which a marker is disposed is captured using an imaging section, a given pattern being drawn on the marker. The position of the marker within the image captured by the imaging section is presumed, and an image recognition process is performed on the marker. A virtual object corresponding to the pattern of the marker is superimposed at the presumed position, and the resulting synthetic image is displayed.

According to the technology disclosed in JP-A-2010-170316, however, the virtual object is superimposed on (synthesized with) the captured image so that the virtual object corresponding to the marker is necessarily displayed on the front side. Therefore, the positional relationship between the virtual object and another object within the captured image may become inconsistent, so that the user may be given a wrong impression.

SUMMARY

According to one aspect of the invention, there is provided an image generation system comprising:

a captured image acquisition section that acquires a captured image captured by an imaging section;

a depth information acquisition section that acquires depth information about a photographic object observed within the captured image;

an object processing section that performs a process that determines a positional relationship between the photographic object and a virtual object in a depth direction based on the acquired depth information, and synthesizes the virtual object with the captured image; and an image generation section that generates an image in which the virtual object is synthesized with the captured image.

According to another aspect of the invention, there is provided an image generation method comprising:

acquiring a captured image captured by an imaging section;

acquiring depth information about a photographic object observed within the captured image;

performing a process that determines a positional relationship between the photographic object and a virtual object in a depth direction based on the acquired depth information, and synthesizes the virtual object with the captured image; and generating an image in which the virtual object is synthesized with the captured image.

According to another aspect of the invention, there is provided a computer-readable information storage medium storing a program that causes a computer to execute the above image generation method.

BRIEF DESCRIPTION OF THE DRAWINGS

FIG. 17 is a flowchart illustrating a specific process according to one embodiment of the invention.

DESCRIPTION OF EXEMPLARY EMBODIMENTS

Figure 1:
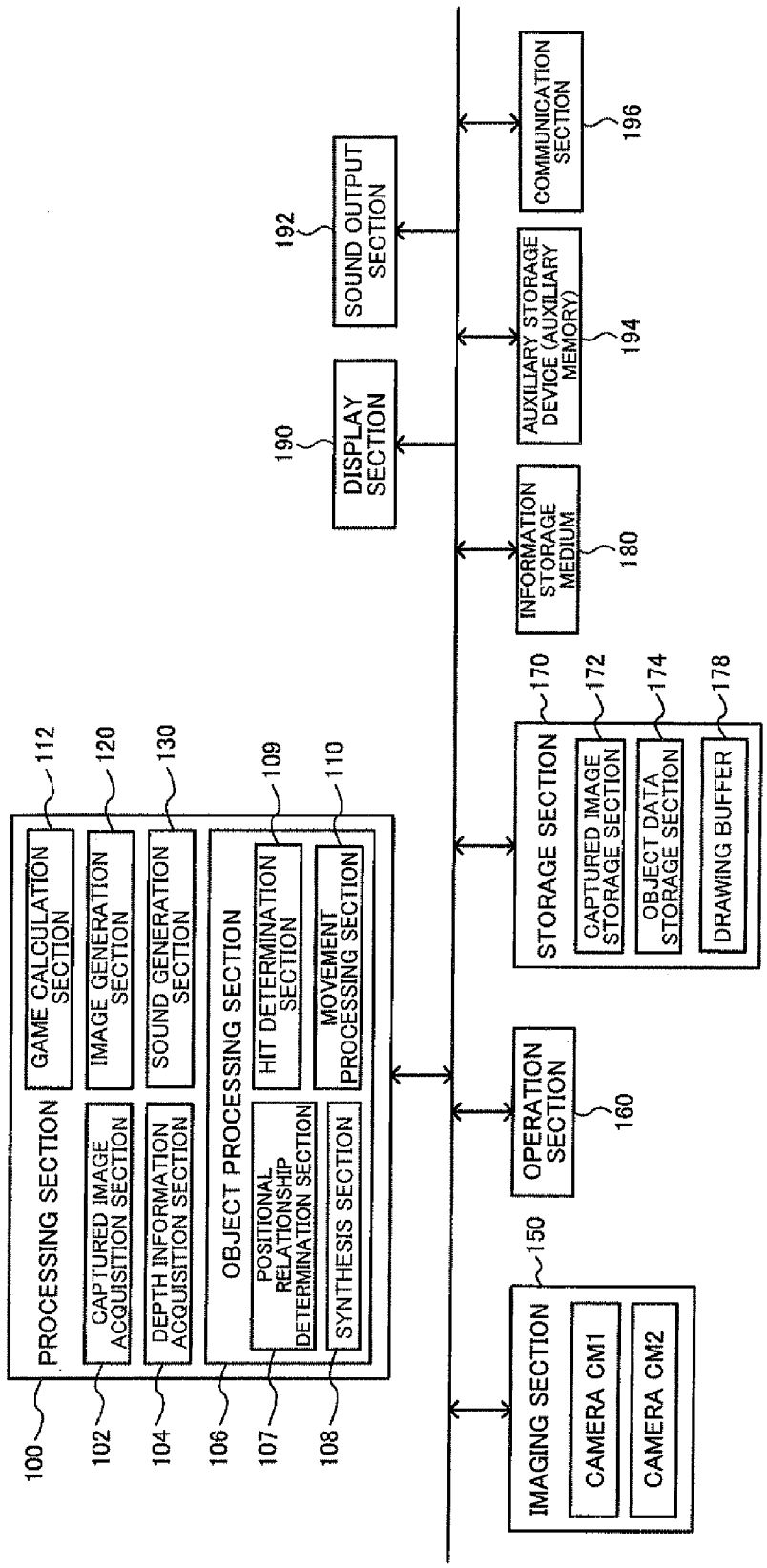
FIG. 1 shows a configuration example of an image generation system according to one embodiment of the invention.

Several aspects of the invention may provide an image generation system, an image generation method, an information storage medium, and the like that improve the degree of augmented reality.

According to one embodiment of the invention, there is provided an image generation system comprising:

a captured image acquisition section that acquires a captured image captured by an imaging section;

a depth information acquisition section that acquires depth information about a photographic object observed within the captured image;

an object processing section that performs a process that determines a positional relationship between the photographic object and a virtual object in a depth direction based on the acquired depth information, and synthesizes the virtual object with the captured image; and an image generation section that generates an image in which the virtual object is synthesized with the captured image.

According to the image generation system, the depth information about the photographic object observed within the captured image is acquired. The positional relationship between the photographic object and the virtual object in the depth direction is determined based on the acquired depth information, and an image in which the virtual object is synthesized with the captured image is generated. This makes it possible to implement a virtual object synthesis process that reflects the depth information about the photographic object, so that the degree of augmented reality can be improved.

In the image generation system,
the object processing section may perform a process that synthesizes an image in which the photographic object is displayed on a front side of the virtual object when it has been determined that the photographic object is positioned on a front side of the virtual object in the depth direction based on the depth information.

This makes it possible to prevent a situation in which an image in which the photographic object is displayed on the rear side of the virtual object is generated even if the photographic object is positioned on the front side of the virtual object.

In the image generation system,
the object processing section may determine the positional relationship between the virtual object and the photographic object in the depth direction based on the depth information about the photographic object and depth information about a placement position determination photographic object for determining a placement position of the virtual object.

This makes it possible to determine the positional relationship between the photographic object and the virtual object in the depth direction using the depth information about the photographic object and the depth information about the placement position determination photographic object of the virtual object, and generate an image in which the virtual object is synthesized with the captured image.

The image generation system may further comprise:
a captured image storage section that stores image data about a plurality of live-view images captured by the imaging section,
the depth information acquisition section may acquire the depth information about the placement position determination photographic object based on the plurality of live-view images, and
the object processing section may determine the positional relationship between the virtual object and the photographic object in the depth direction based on the depth information about the photographic object and the depth information about the placement position determination photographic object acquired from the plurality of live-view images.

This makes it possible to appropriately determine the positional relationship between the photographic object and the virtual object in the depth direction by effectively utilizing the live-view image.

In the image generation system,
the depth information acquisition section may acquire the depth information about the placement position determination photographic object based on a live-view image among the plurality of live-view images, in which it has been determined that a placement position determination area of the placement position determination photographic object is not hidden behind the photographic object.

This makes it possible to appropriately determine the positional relationship between the photographic object and the virtual object in the depth direction by effectively utilizing the live-view image, even if the placement position determination area of the placement position determination photographic object is hidden behind the photographic object.

In the image generation system,
the object processing section may perform a hit determination process on the photographic object and the virtual object based on the depth information.

This makes it possible to implement a hit determination process on the photographic object and the virtual object that reflects the acquired depth information.

In the image generation system,
the object processing section may set a hit volume for the virtual object based on depth information about a placement position determination photographic object for determining a placement position of the virtual object, and may perform the hit determination process on the photographic object and the virtual object using the set hit volume.

This makes it possible to set the hit volume for the virtual object based on the depth information about the placement position determination photographic object, and perform the hit determination process using the hit volume. Therefore, a more accurate hit determination process can be implemented.

In the image generation system,
the object processing section may perform at least one of a process that changes a display state of the virtual object and a process that outputs sound corresponding to the virtual object when it has been determined that the photographic object has hit the virtual object by the hit determination process.

According to this feature, since the display state of the virtual object is changed, or sound corresponding to the virtual object is output when the photographic object has hit the virtual object, the reality of the virtual object is enhanced, so that the degree of augmented reality can be further improved.

In the image generation system,
the object processing section may perform a movement process of the virtual object based on the depth information.

This makes it possible to implement a movement process on the virtual object that reflects the acquired depth information.

In the image generation system,
the object processing section may move the virtual object between a position of a placement position determination photographic object for determining a placement position of the virtual object and a position of the photographic object based on depth information about the placement position determination photographic object and the depth information about the photographic object.

According to this feature, when the depth information about the placement position determination photographic object and the depth information about the photographic object have been acquired, an image in which the virtual object moves between the position of the placement position determination photographic object and the position of the photographic object is generated. This makes it possible to generate a novel augmented reality image.

In the image generation system,
the captured image acquisition section may acquire a first captured image captured by a first camera included in the imaging section as a left-eye image, and may acquire a second captured image captured by a second camera included in the imaging section as a right-eye image, and
the depth information acquisition section may acquire the depth information based on parallax information obtained from the left-eye image and the right-eye image.

This makes it possible to acquire the depth information by effectively utilizing the left-eye image captured by the first camera and the right-eye image captured by the second camera.

In the image generation system,
the image generation section may generate an image in which the virtual object is synthesized with a stereoscopic image generated using the left-eye image and the right-eye image.

This makes it possible to implement advanced augmented reality and stereoscopic representation in combination.

In the image generation system,
the captured image acquisition section may acquire a depth image from a depth camera included in the imaging section, and
the depth information acquisition section may acquire the depth information based on the depth image.

This makes it possible to acquire more accurate depth information about the photographic object by utilizing the depth image from the depth camera.

According to another embodiment of the invention, there is provided an image generation method comprising:
acquiring a captured image captured by an imaging section;
acquiring depth information about a photographic object observed within the captured image;
performing a process that determines a positional relationship between the photographic object and a virtual object in a depth direction based on the acquired depth information, and synthesizes the virtual object with the captured image; and
generating an image in which the virtual object is synthesized with the captured image.

According to another embodiment of the invention, there is provided a computer-readable information storage medium storing a program that causes a computer to execute the above image generation method.

Exemplary embodiments of the invention are described below. Note that the following exemplary embodiments do not in any way limit the scope of the invention laid out in the claims. Note also that all of the elements of the following exemplary embodiments should not necessarily be taken as essential elements of the invention.

1. Configuration

FIG. 1 shows an example of a block diagram of an image generation system (game device or portable electronic instrument) according to one embodiment of the invention. Note that the image generation system according to one embodiment of the invention is not limited to the configuration shown in FIG. 1. Various modifications may be made, such as omitting some of the elements (sections) or adding other elements (sections).

An imaging section 150 captures (photographs) a photographic object (imaging target). The imaging section 150 includes an imaging element (e.g., CCD or CMOS sensor), and an optical system (e.g., lens). The imaging section 150 may also include a shutter mechanism (electronic shutter or mechanical shutter), an analog front-end circuit (A/D conversion circuit), a focus adjustment section, and the like. A captured image (captured image data) captured by the imaging section 150 is stored in a captured image storage section 172 (image buffer).

In FIG. 1, the imaging section 150 includes a first camera CM1 and a second camera CM2. When the imaging section 150 captures a stereoscopic image, the first camera CM1 serves as a left-eye camera, and the second camera CM2 serves as a right-eye camera. In one embodiment of the invention, depth information can be acquired based on a left-eye image that is a first captured image captured by the first camera CM1 included in the imaging section 150, and a right-eye image that is a second captured image captured by the second camera CM2. Note that the imaging section 150 may include a depth camera and a color image camera. In this case, the depth information may be acquired based on a depth image from the depth camera included in the imaging section 150.

An operation section 160 allows the player (user in a broad sense) to input operation data. The function of the operation section 160 may be implemented by a direction key, an operation button, an analog stick, a lever, a sensor (e.g., angular velocity sensor or acceleration sensor), a microphone, a touch panel display, or the like.

A storage section 170 serves as a work area for a processing section 100, a communication section 196, and the like. The function of the storage section 170 may be implemented by a RAM (DRAM or VRAM) or the like. A game program and game data necessary when executing the game program are stored in the storage section 170.

An information storage medium 180 (computer-readable medium) stores a program, data, etc. The function of the information storage medium 180 may be implemented by an optical disk (DVD or CD), a hard disk drive (HDD), a memory (e.g., ROM), or the like. The processing section 100 performs various processes according to one embodiment of the invention based on a program (data) stored in the information storage medium 180. Specifically, a program that causes a computer (i.e., a device including an operation section, a processing section, a storage section, and an output section) to function as each section according to one embodiment of the invention (i.e., a program that causes a computer to execute the process of each section) is stored in the information storage medium 180.

A display section 190 outputs an image generated according to one embodiment of the invention. The function of the display section 190 may be implemented by an LCD, an organic EL display, a CRT, a touch panel display, a head mount display (HMD), or the like. A sound output section 192 outputs sound generated according to one embodiment of the invention. The function of the sound output section 192 may be implemented by a speaker, a headphone, or the like.

An auxiliary storage device 194 (auxiliary memory or secondary memory) is a storage device used to supplement the capacity of the storage section 170. The auxiliary storage device 194 may be implemented by a memory card such as an SD memory card or a multimedia card, or the like.

The communication section 196 communicates with the outside (e.g., another image generation system, a server, or a host device) via a cable or wireless network. The function of the communication section 196 may be implemented by hardware such as a communication ASIC or a communication processor, or communication firmware.

A program (data) that causes a computer to function as each section according to one embodiment of the invention may be distributed to the information storage medium 180 (or the storage section 170 or the auxiliary storage device 194) from an information storage medium included in a server (host device) via a network and the communication section 196. Use of the information storage medium included in the server (host device) is also included within the scope of the invention.

The processing section 100 (processor) performs a game process, an image generation process, a sound generation process, and the like based on operation data from the operation section 160, a program, and the like. The processing section 100 performs various processes using the storage section 170 as a work area. The function of the processing section 100 may be implemented by hardware such as a processor (e.g., CPU or GPU) or an ASIC (e.g., gate array), or a program.

The processing section 100 includes a captured image acquisition section 102, a depth information acquisition section 104, an object processing section 106, a game calculation section 112, an image generation section 120, and a sound generation section 130. Note that various modifications may be made, such as omitting some (e.g., game calculation section) of the elements or adding other elements.

The captured image acquisition section 102 acquires the captured image captured by the imaging section 150. Note that the captured image acquisition section 102 may acquire an image received from the communication section 196 or an image stored in the storage section 170 as the captured image. The depth information acquisition section 104 acquires the depth information. The object processing section 106 performs various processes on an object (e.g., virtual object). The object processing section 106 includes a positional relationship determination section 107, a synthesis section 108, a hit determination section 109, and a movement processing section 110. Note that the details of the configuration and the operation of these sections are described later.

The game calculation section 112 performs a game calculation process. The game calculation process includes starting the game when game start conditions have been satisfied, proceeding with the game, calculating the game results, and finishing the game when game finish conditions have been satisfied, for example.

The image generation section 120 performs a drawing process based on the results of various processes (game process and simulation process) performed by the processing section 100 to generate an image, and outputs the generated image to the display section 190. Specifically, the image generation section 120 performs a geometric process (e.g., coordinate transformation (world coordinate transformation and camera coordinate transformation), clipping, perspective transformation, or light source process), and generates drawing data (e.g., primitive surface vertex position coordinates, texture coordinates, color data, normal vector, or alpha-value) based on the results of the geometric process. The image generation section 120 draws the object (one or more primitive surfaces) subjected to perspective transformation in a drawing buffer 178 (i.e., a buffer (e.g., frame buffer or work buffer) that can store image information corresponding to each pixel) based on the drawing data (primitive surface data). The image generation section 120 thus generates an image viewed from the virtual camera (given viewpoint) in the object space. The drawing process may be implemented by a vertex shader process or a pixel shader process.

The image generation section 120 may generate a stereoscopic image. In this case, a left-eye virtual camera and a right-eye virtual camera are disposed using a reference virtual camera position and a reference inter-camera distance. The image generation section 120 generates a left-eye image viewed from the left-eye virtual camera in the object space, and generates a right-eye image viewed from the right-eye virtual camera in the object space. Stereoscopic vision may be implemented by a stereoscopic glass method or a naked-eye method using a lenticular lens or the like by utilizing the left-eye image and the right-eye image.

The sound generation section 130 performs a sound process based on the results of various processes performed by the processing section 100 to generate game sound (e.g., background music (BGM), effect sound, or voice), and outputs the generated game sound to the sound output section 192.

In one embodiment of the invention, when the captured image acquisition section 102 has acquired a captured image captured by the imaging section 150, the depth information acquisition section 104 acquires the depth information about the photographic object observed within the captured image. The object processing section 106 performs a process that determines the positional relationship between the photographic object and the virtual object in the depth direction (Z-axis direction) based on the acquired depth information, and synthesizes the virtual object with the captured image. The image generation section 120 then generates an image in which the virtual object is synthesized with the captured image. The captured image may be a still image or a movie (moving image).

Specifically, the object processing section 106 performs a process that synthesizes an image in which the photographic object is displayed on the front side of the virtual object when it has been determined that the photographic object is positioned on the front side of the virtual object in the depth direction based on the depth information. For example, the object processing section 106 performs a synthesis process (drawing process) that causes part of the virtual object that is positioned on the rear side of the photographic object to be hidden behind the photographic object. For example, the object processing section 106 determines the positional relationship between the virtual object and the photographic object in the depth direction based on the depth information about the photographic object and the depth information about a placement position determination photographic object (e.g., a marker on which a placement position determination pattern is drawn) for determining the placement position of the virtual object. When it has been determined that the photographic object (e.g., the hand of the user) is positioned on the front side of the placement position determination photographic object, an image in which the photographic object (e.g., hand) is displayed on the front side of the virtual object is generated. Specifically, an image in which the virtual object is subjected to hidden surface removal with respect to the photographic object (e.g., hand) is generated.

The photographic object observed within the captured image is an object in the real world for which the positional relationship with the virtual object should be determined. Specifically, the photographic object is part (e.g., hand) of the user (player) or a thing possessed (held) by the user (player). The depth information indicates the depth value (Z-value) in the depth direction, for example. Specifically, the depth information indicates the depth value or the like in the optical axis direction of the cameras CM1 and CM2 included in the imaging section 150.

The virtual object is synthesized with part of the actual environment as additional information when implementing augmented reality (AR). Specifically, the virtual object is an object such as a character (e.g., human, animal, robot, car, ship, or airplane). The virtual object may be formed by a plurality of primitive surfaces (e.g., polygon, free-form surface, or subdivision surface). Object data about the virtual object is stored in an object data storage section 174.

The positional relationship in the depth direction refers to a relationship about whether the photographic object is positioned on the front side or the rear side of the virtual object when viewed from the imaging section 150 (cameras CM1 and CM2). The positional relationship determination section 107 determines the positional relationship in the depth direction. The process that synthesizes the virtual object with the captured image refers to a process that synthesizes the virtual object with the captured image while performing hidden surface removal (i.e., a process that does not draw part (pixel) of the virtual object that is positioned on the rear side of the photographic object (i.e., hidden behind the photographic object)). The synthesis section 108 performs the synthesis process. Note that a translucent blending process (alpha-blending process) may be performed on an area where the photographic object overlaps the virtual object.

The captured image storage section 172 stores image data about a plurality of live-view images captured by the imaging section 150. The live-view image refers to an image (movie) that is captured by the imaging section 150 and displayed on the display section 190 or the like even when the user does not perform a shutter-release operation. For example, image data about a series of live-view images is sequentially stored in the captured image storage section 172 having a ring buffer structure, for example. The depth information acquisition section 104 acquires the depth information about the placement position determination photographic object based on the plurality of live-view images. Specifically, the depth information acquisition section 104 acquires the depth information about the placement position determination photographic object based on the plurality of live-view images for which it has been determined that the placement position determination area (e.g., pattern area) of the placement position determination photographic object is not hidden behind the photographic object. For example, the depth information acquisition section 104 detects a live-view image in which at least an area necessary for determining the placement position is not hidden behind the photographic object from a plurality of live-view images in which the placement position determination photographic object is displayed, and acquires the depth information about the placement position determination photographic object based on the detected live-view image. The object processing section 106 (positional relationship determination section 107) determines the positional relationship between the virtual object and the photographic object in the depth direction based on the depth information about the photographic object and the depth information about the placement position determination photographic object acquired from the live-view image. This makes it possible to appropriately acquire the depth information about the placement position determination photographic object even if part of the placement position determination photographic object is hidden behind the photographic object (e.g., the hand of the user).

The object processing section 106 may perform a hit determination process on the photographic object and the virtual object based on the depth information. The hit determination section 109 performs the hit determination process. Specifically, the object processing section 106 sets a hit volume (hit box or hit area) for the virtual object based on the depth information about the placement position determination photographic object for determining the placement position of the virtual object. For example, the object processing section 106 disposes (sets) the hit volume for the virtual object at a position corresponding to the depth value of the placement position determination photographic object. The object processing section 106 performs the hit determination process on the photographic object and the virtual object using the set hit volume. For example, the hit determination process is implemented by determining whether or not a hit volume for the photographic object that is set at a position corresponding to the depth value of the photographic object overlaps the hit volume for the virtual object. Alternatively, the hit determination process may be performed based on the position of the photographic object and the hit volume for the virtual object.

When it has been determined that the photographic object has hit the virtual object by the hit determination process, the object processing section 106 performs at least one of a process that changes the display state of the virtual object and a process that outputs sound corresponding to the virtual object. The process that changes the display state of the virtual object refers to a process that causes the virtual object to make a motion, a process that changes the image (e.g., color or luminance) of the virtual object, and the like. For example, the object processing section 106 performs a virtual object animation process (motion process) (i.e., a motion made by the virtual object when the photographic object has hit the virtual object). The process that outputs sound corresponding to the virtual object refers to a process that outputs hit sound or effect sound, and the like. For example, the voice of the virtual object provided as sound produced when the photographic object has hit the virtual object is output.

The object processing section 106 may perform a movement process on the virtual object based on the depth information. Specifically, the object processing section 106 causes the virtual object to perform a movement corresponding to the depth information. The movement processing section 110 performs the movement process.

Specifically, the object processing section 106 performs the movement process based on the depth information about the photographic object and the depth information about the placement position determination photographic object for determining the placement position of the virtual object. For example, the object processing section 106 moves the virtual object between the position of the placement position determination photographic object and the position of the photographic object. For example, the object processing section 106 moves the virtual object from the position of the placement position determination photographic object (i.e., the position of the marker) to the position of the photographic object.

The captured image acquisition section 102 acquires a first captured image captured by the first camera CM1 included in the imaging section 150 as a left-eye image, and acquires a second captured image captured by the second camera CM2 included in the imaging section 150 as a right-eye image. The depth information acquisition section 104 acquires the depth information based on parallax information (difference in display position due to parallax) obtained from the left-eye image and the right-eye image. For example, the depth information acquisition section 104 determines that the depth value of the photographic object or the like is small when the parallax (difference in the display position of an identical object) indicated by the parallax information is small, and determines that the depth value is large when the parallax (difference in the display position of an identical object) is large.

In this case, the image generation section 120 generates an image in which the virtual object is synthesized with a stereoscopic image generated using the left-eye image and the right-eye image. Specifically, the image generation section 120 generates a stereoscopic image by which the photographic object and the virtual object are three-dimensionally observed.

The stereoscopic method may be a stereoscopic glass method, a naked-eye method using a parallax barrier, a lenticular lens, or another optical element that can control the beam direction, or the like. Examples of the stereoscopic glass method include a polarized glass method, a page-flip method, a two-color separation method, and the like. When using the polarized glass method, a left-eye image and a right-eye image are alternately displayed in an odd-numbered line and an even-numbered line of the display section 190, and are observed through polarized glasses (e.g., glasses provided with a horizontal polarizing filter (left) and a vertical polarizing filter (right)) to implement a stereoscopic view. Alternatively, a left-eye image and a right-eye image may be projected using a projector provided with a special polarizing filter, and observed through polarized glasses to implement a stereoscopic view. When using the page-flip method, a left-eye image and a right-eye image are alternately displayed on the display section 190 in a given cycle (e.g., every 1/120th of a second or 1/60th of a second). A left-eye liquid crystal shutter and a right-eye liquid crystal shutter of glasses are alternately opened and closed in the above cycle to implement a stereoscopic view. When using the two-color separation method, an anaglyph image is generated, and observed through red-cyan glasses or the like to implement a stereoscopic view.

The image generation section 120 or the display section 190 (e.g., television) may be provided with the function of generating a stereoscopic image from the left-eye image and the right-eye image. For example, the image generation section 120 outputs side-by-side image signals. The display section 190 then displays a field-sequential image in which the left-eye image and the right-eye image are alternately assigned to an odd-numbered line and an even-numbered line based on the side-by-side image signals. The display section 190 may display a frame-sequential image in which the left-eye image and the right-eye image are alternately switched in a given cycle. Alternatively, the image generation section 120 may generate a field-sequential image or a frame-sequential image, and output the generated image to the display section 190.

Note that the captured image acquisition section 102 may acquire a depth image from a depth camera (not shown) included in the imaging section 150, and the depth information acquisition section 104 may acquire the depth information based on the depth image. Alternatively, the depth information acquisition section 104 may acquire the depth information using a distance sensor or the like.

2. Method

A method according to one embodiment of the invention is described in detail below.

2.1 Virtual Object Synthesis Process Based on Depth Information

Figure 2A:
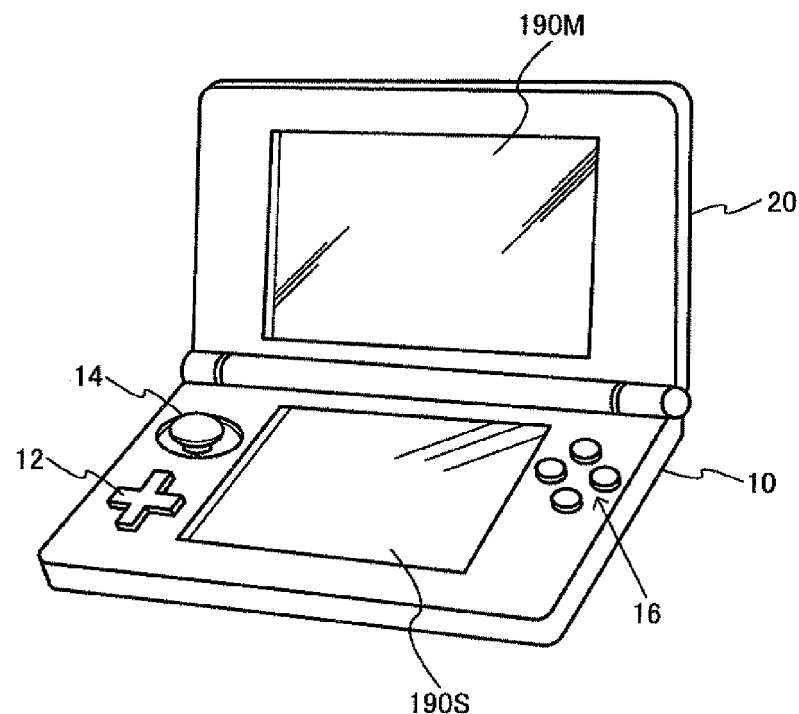
FIGS. 2A and 2B show a configuration example of a portable game device that is an example of an image generation system.

An example of a portable game device to which the image generation system according to one embodiment of the invention is applied is described below with reference to FIGS. 2A and 2B. A portable game device shown in FIGS. 2A and 2B includes a main display section 190M and a sub-display section 190S. The sub-display section 190S is implemented by a touch-panel liquid crystal display or the like, and provided in a housing 10 of the game device. The main display section 190M is a display of which the number of pixels is larger than that of the sub-display section 190S, for example. The main display section 190M is implemented by a liquid crystal display or the like.

The housing 10 and a housing 20 of the game device are rotatably provided. A direction key 12, an analog stick 14, and operation buttons 16 are provided on the housing 10. As shown in FIG. 2B, a first camera CM1 and a second camera CM2 are provided on the rear side (i.e., the side opposite to the main display section 190M) of the housing 20. A left-eye image and a right-eye image having parallax can be obtained by capturing the photographic object using the first camera CM1 and the second camera CM2, a stereoscopic display can be implemented.

Figure 3A:
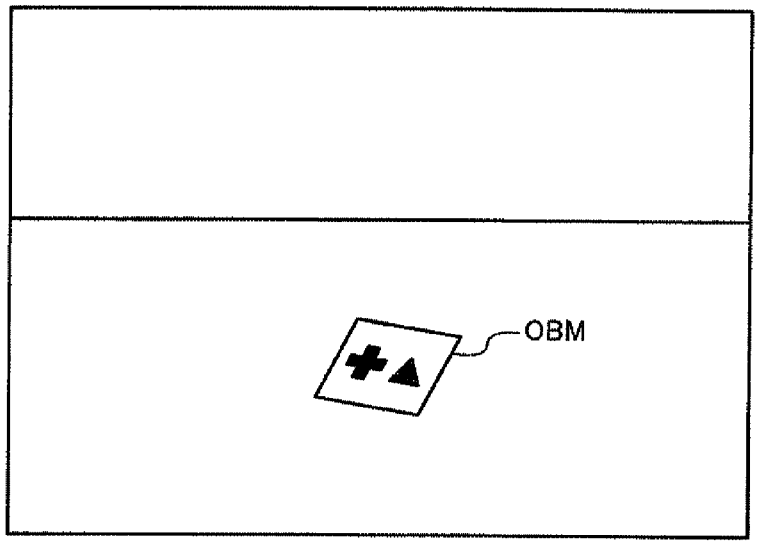
FIGS. 3A and 3B are views illustrating a method that disposes a virtual object at a position of a placement position determination marker.
Figure 3B:
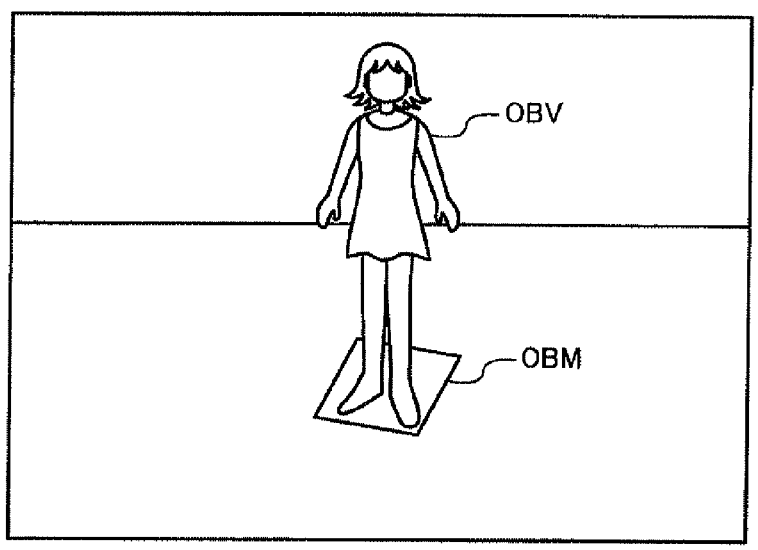

FIG. 3A shows a placement position determination marker OBM (card) that is an example of a placement position determination photographic object. A pattern (e.g., symbol or character) for determining the type and the like of a virtual object that is caused to appear is drawn on the marker OBM. The marker OBM is captured by the imaging section 150, and an image recognition process is performed on the pattern drawn on the marker OBM. A virtual object OBV (see FIG. 3B) corresponding to the marker OBM is caused to appear based on the results of the image recognition process. Specifically, an image in which an image of the virtual object OBV is synthesized with the image captured by the imaging section 150 is generated. The generated image is displayed on the display section 190, or stored in the storage section 170.

This makes it possible for the user to cause the virtual object OBV to appear in an image captured by the user by disposing the marker OBM (card) corresponding to the desired virtual object, so that augmented reality (AR) can be implemented.

Figure 4:
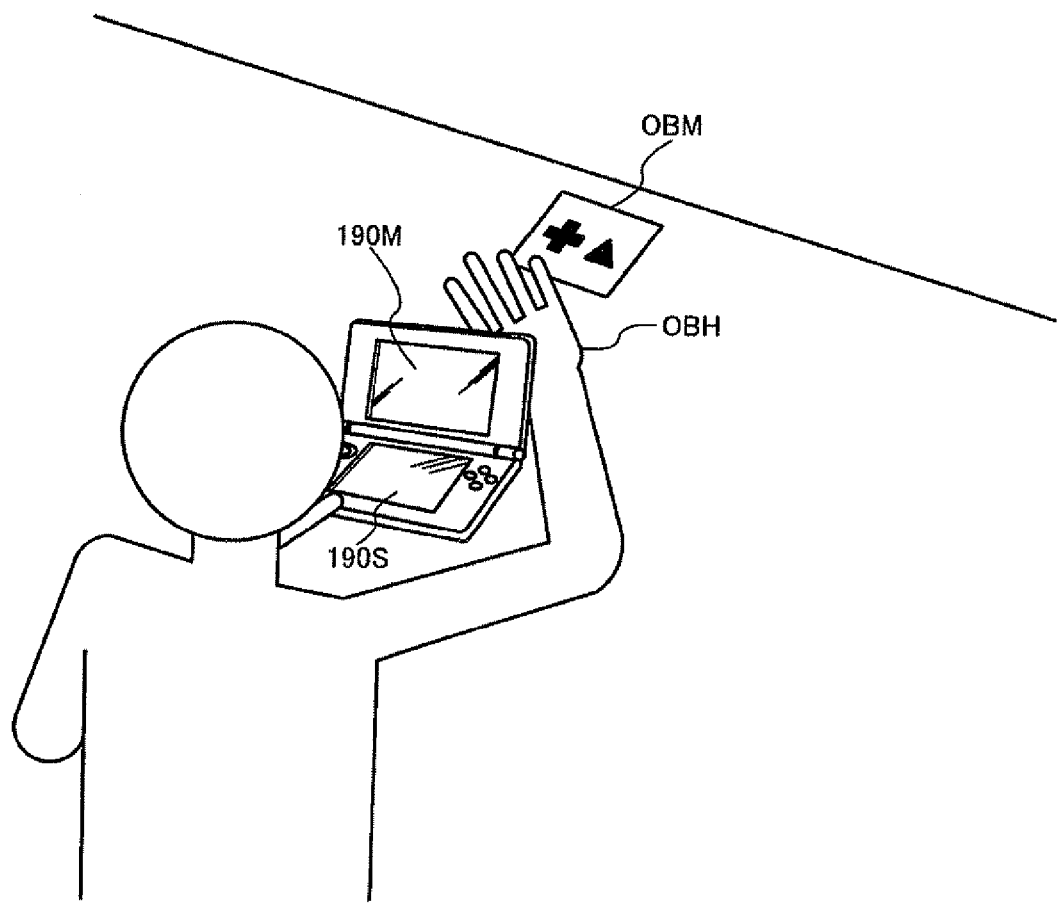
FIG. 4 is a view illustrating a situation in which a photographic object is captured using a portable game device.

FIG. 4 shows a situation in which the user holds the portable game device (portable terminal) (see FIGS. 2A and 2B) with the left hand, and captures the marker OBM using the imaging section 150. In FIG. 4, the user extends the right hand OBH (i.e., object) so that the hand OBH is positioned between the imaging section 150 of the game device and the marker OBM.

Figure 5:
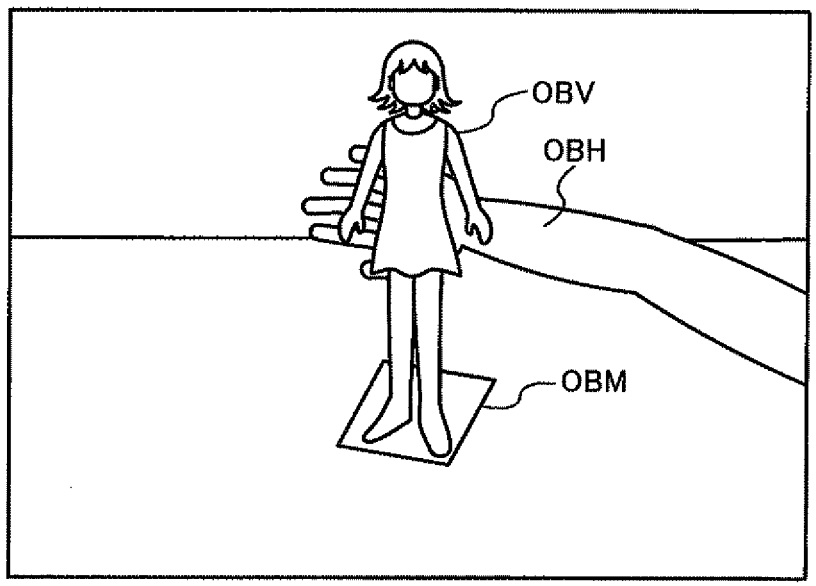
FIG. 5 shows an example of a synthetic image of a virtual object.

In this case, an image as shown in FIG. 5 is generated when using a related-art augmented reality implementation method. Specifically, the hand OBH (object in a broad sense) of the user should be displayed on the front side of the virtual object OBV in the situation shown in FIG. 4. However, the image shown in FIG. 5 is generated so that the hand OBH is positioned on the rear side of the virtual object OBV. When using a related-art augmented reality implementation method, the virtual object OBV is superimposed on an image captured by the user. Specifically, the positional relationship between the virtual object OBV and the hand OBH of the user in the depth direction is not determined, and the virtual object OBV is necessarily drawn on the front side of the hand OBH (i.e., object) irrespective of the positional relationship between the virtual object OBV and the hand OBH in the depth direction. Therefore, since the user has an impression that the image is unnatural, sufficient augmented reality cannot be implemented.

In one embodiment of the invention, depth information about a photographic object (e.g., hand OBH) displayed within the captured image is acquired. The positional relationship between the photographic object (e.g., hand OBH) and the virtual object OBV in the depth direction is determined based on the acquired depth information, and the virtual object is synthesized with the captured image. Specifically, when it has been determined that the hand OBH (object) is positioned on the front side of the virtual object OBV in the depth direction (direction Z) (see FIG. 4) based on the depth information, an image in which the hand OBH is displayed on the front side of the virtual object OBV is generated (see FIG. 6A). When it has been determined that the hand OBH is positioned on the rear side of the virtual object OBV, an image in which the hand OBH is displayed on the rear side of the virtual object OBV is generated (see FIG. 5).

Figure 6A:
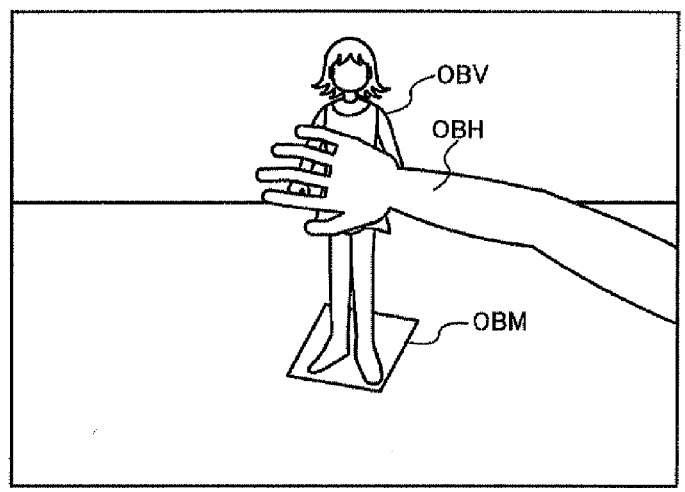
FIGS. 6A and 6B are views illustrating a method according to one embodiment of the invention.

According to the above configuration, since the image shown in FIG. 6A is generated when the hand OBH is positioned on the front side of the virtual object OBV (marker OBM), and the image shown in FIG. 5 is generated when the hand OBH is positioned on the rear side of the virtual object OBV (marker OBM), the user has an impression that the virtual object OBV really exists around the hand OBH of the user. This makes it possible to implement novel augmented reality.

In particular, the method according to one embodiment of the invention focuses on the fact that the depth information about the photographic object can be acquired from the captured image of the photographic object (described later). The depth information about the photographic object is extracted from the captured image with which the virtual object OBV is synthesized, and the captured image and the virtual object OBV are synthesized based on the extracted depth information. This makes it possible to generate a synthetic image having an appropriate positional relationship by utilizing the depth information extracted from the captured image.

Figure 6B:
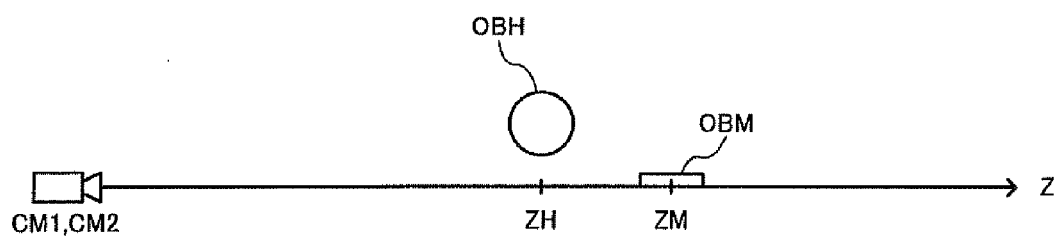

As shown in FIG. 6B, a depth value ZM (depth information) of the placement position determination marker OBM (placement position determination photographic object in a broad sense) for determining the placement position of the virtual object OBV, and a depth value ZH (depth information) of the hand OBH (object) are acquired. The positional relationship between the virtual object OBV and the hand OBH in the depth direction is determined based on the depth values ZM and ZH. Specifically, the depth value ZM is compared with the depth value ZH. When the depth value ZH is smaller than the depth value ZM, it is determined that the hand OBH is positioned on the front side of the virtual object OBV (marker OBM), and an image as shown in FIG. 6A is generated. Specifically, an image in which part of the virtual object OBV is subjected to hidden surface removal with respect to the hand OBH is generated.

This makes it possible to cause the virtual object OBV corresponding to the pattern of the marker OBM to appear, and generate an augmented reality image while appropriately determining the positional relationship between the virtual object OBV and the hand OBH in the depth direction.

Although FIGS. 6A and 6B show an example in which the placement position determination photographic object of the virtual object is a marker, the placement position determination photographic object is not limited to a marker. For example, a shape recognition process may be performed on the photographic object, and a virtual object corresponding to the results of the shape recognition process may be caused to appear. Specifically, a first virtual object is caused to appear when an object having a first shape (e.g., quadrangular shape) has been recognized, and a second virtual object is caused to appear when an object having a second shape (e.g., round shape) has been recognized.

The photographic object with which the virtual object subjected to hidden surface removal is not limited to the part (e.g., hand) of the user, but may be a thing (e.g., pen or pointer) possessed (held) by the user. FIG. 6A shows an example of a synthetic image when the virtual object is subjected to complete hidden surface removal with the photographic object (e.g., the hand of the user) when the photographic object is positioned on the front side of the virtual object. Note that it is also possible to generate an image in which an image of the photographic object (e.g., hand) and an image of the virtual object are translucently blended (synthesized). The process that determines the positional relationship between the photographic object (e.g., hand) and the virtual object in the depth direction is not limited to the method shown in FIG. 6B. Various modifications and variations may be made.

2.2 Live-View Image

When the hand OBH of the user is positioned between the imaging section 150 of the game device and the marker OBM, as shown in FIG. 4, it may be difficult to appropriately recognize the image of the pattern of the marker OBM. In such a case, the depth information about the marker OBM is acquired by effectively utilizing a live-view image (movie) that is normally used for a digital camera or the like. The live-view image is displayed on the main display section 190M in FIG. 4, for example.

Figure 7A:
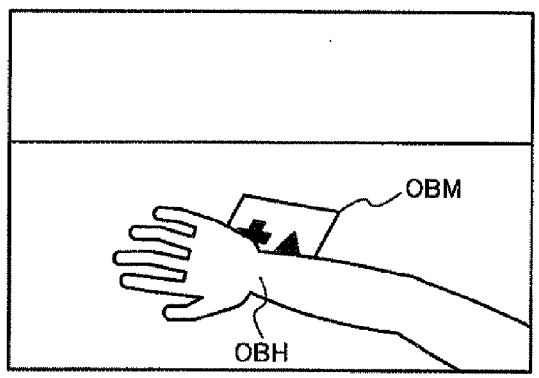
FIGS. 7A to 7D are views illustrating a marker recognition method using a live-view image.
Figure 7B:
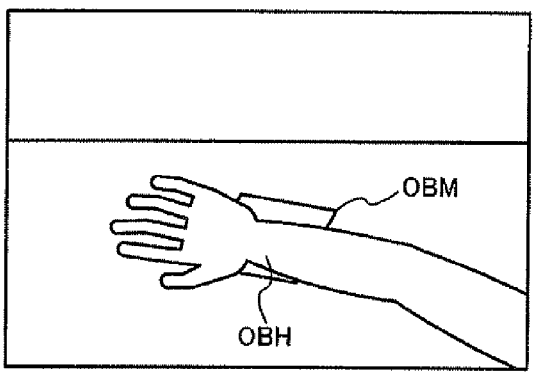
Figure 7C:
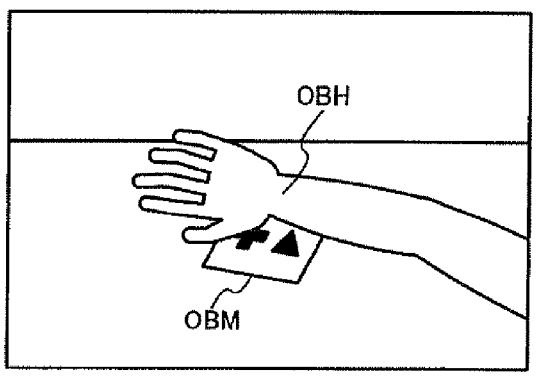

FIGS. 7A to 7D show an example of a series of live-view images captured by the imaging section 150. In FIGS. 7A to 7C, the pattern area (i.e., placement position determination area) of the marker OBM is hidden behind the hand OBH (i.e., object). Therefore, since the image of the pattern area (e.g., character or symbol) of the marker OBM cannot be appropriately recognized, it is difficult to cause an appropriate virtual object to appear.

Figure 7D:
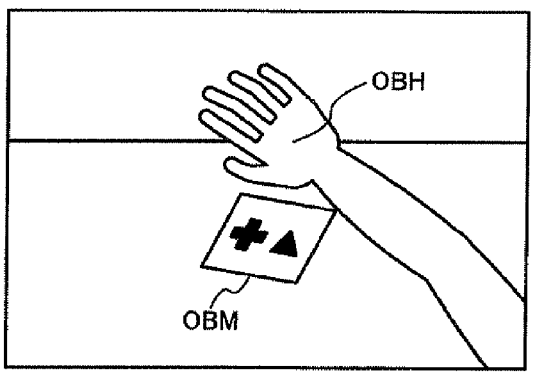

In FIG. 7D, the pattern area (i.e., placement position determination area) of the marker OBM is not hidden behind the hand OBH. Therefore, since the image of the pattern area of the marker OBM can be appropriately recognized by utilizing the live-view image shown in FIG. 7D, an appropriate virtual object can be caused to appear.

In one embodiment of the invention, a series of live-view images as shown in FIGS. 7A to 7D is stored in the captured image storage section 172. For example, a plurality of live-view images acquired during at least one of a period that precedes the timing when the user has performed a shutter-release operation and a period that follows the timing when the user has performed a shutter-release operation are stored. The depth information about the placement position determination marker OBM (placement position determination photographic object) is acquired based on a live-view image among the plurality of live-view images (each image of the movie) for which it has been determined that the pattern area (placement position determination area) is not hidden behind the hand OBH (i.e., object) (part of the pattern area may be hidden behind the hand OBH).

For example, a matching process with a template pattern is performed on the plurality of live-view images shown in FIGS. 7A to 7D. Specifically, the matching process with the template pattern (e.g., character or symbol used as a template) is performed on a plurality of live-view images acquired during at least one of a period that precedes the timing when the user has performed a shutter-release operation and a period that follows the timing when the user has performed a shutter-release operation. For example, the matching process is performed on a feature quantity extracted from a plurality of live-view images and a feature quantity of the template pattern. In the examples shown in FIGS. 7A to 7D, since it is determined that the pattern displayed in the live-view image shown in FIG. 7D and the template pattern match up, the depth information about the marker OBM is acquired from the live-view image shown in FIG. 7D.

The positional relationship between the virtual object OBV and the hand OBH in the depth direction is determined based on the depth information about the hand OBH and the depth information about the marker OBM acquired from the live-view image shown in FIG. 7D.

According to the above configuration, since the depth information about the marker OBM can be acquired, and the positional relationship between the virtual object OBV and the hand OBH in the depth direction can be determined, even if the pattern of the marker OBM is hidden behind the hand OBH of the user, the virtual object OBV can be displayed to have an appropriate positional relationship with the hand OBH in the depth direction.

Note that the live-view image stored in the captured image storage section 172 may have a resolution lower than that of a captured image recorded when the user has performed a shutter-release operation. It is also possible to instruct the user not to position his hand in front of the imaging section, and acquire the depth information about the marker OBM based on an image captured in a state in which the user does not position his hand in front of the imaging section. Even when part of the pattern of the marker OBM is hidden behind the hand OBH (see FIG. 7C), it may be determined that the pattern area is not hidden behind the hand OBH, and the depth information about the marker OBM may be acquired when the matching rate with the template pattern is equal to or higher than a given value.

2.3 Hit Determination Process

A hit determination process may be performed on the photographic object and the virtual object based on the depth information acquired from the captured image.

Figure 8A:
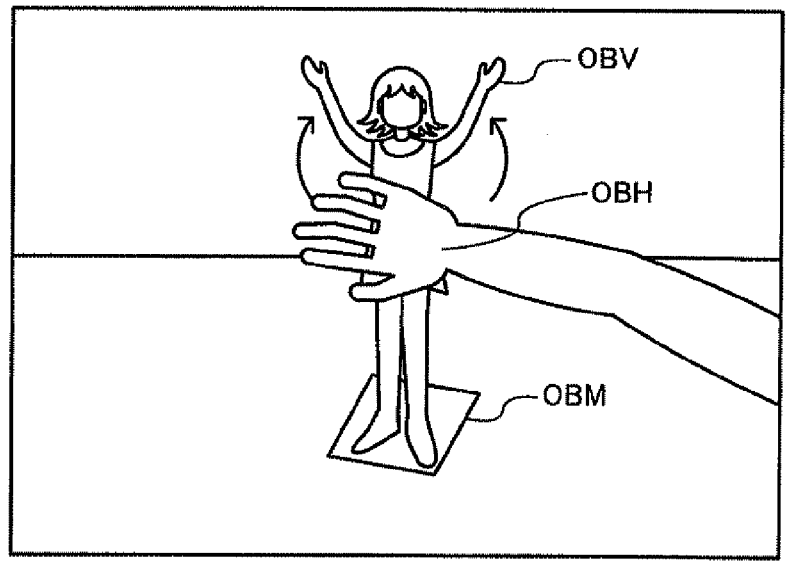
FIGS. 8A and 8B are views illustrating a virtual object display state change process and a sound output process using a hit determination result.
Figure 8B:
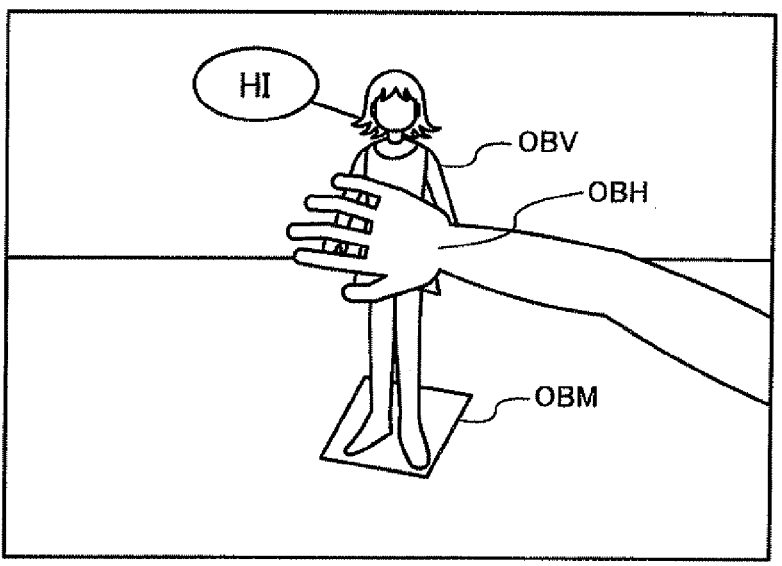

In FIGS. 8A and 8B, the user moves the hand OBH toward the virtual object OBV. In this case, the hit determination process is performed on the hand OBH and the virtual object OBV based on the acquired depth information. When it has been determined that the hand OBH has hit the virtual object OBV, it is determined that the hand OBH has virtually come in contact with the virtual object OBV. In this case, the display state of the virtual object OBV is changed, or sound corresponding to the virtual object OBV is output.

In FIG. 8A, when it has been determined that the hand OBH has hit (come in contact with) the virtual object OBV, an animation process (motion process) is performed on the virtual object OBV. In FIG. 8A, the animation process that causes the virtual object OBV to raise both hands is performed.

The animation process may be implemented using a still image, or may be implemented using a movie. When implementing the animation process using a still image, the virtual object OBV that lowers both hands is synthesized with the captured still image when it has been determined that the hand OBH has not bit the virtual object OBV. When it has been determined that the hand OBH has hit the virtual object OBV, the virtual object OBV that raises both hands is synthesized with the captured still image.

When implementing the animation process using a movie, a movie (live-view image) in which the virtual object OBV is synthesized with the captured image is displayed on the main display section 190M shown in FIG. 4. When it has been determined that the hand OBH has not hit the virtual object OBV, a movie in which the virtual object OBV that lowers both hands is synthesized with the captured image is displayed on the main display section 190M. When it has been determined that the hand OBH has hit the virtual object OBV, a movie in which the virtual object OBV that raises both hands is synthesized with the captured image is displayed on the main display section 190M.

In FIG. 8B, when it has been determined that the hand OBH has hit the virtual object OBV, sound corresponding to the virtual object OBV is output. Specifically, the virtual object OBV produces sound (e.g., "Hi") corresponding to a state in which the hand OBH has touched the virtual object OBV. In this case, effect sound or the like corresponding to a state in which the hand OBH has touched the virtual object OBV may be output.

Figure 9:
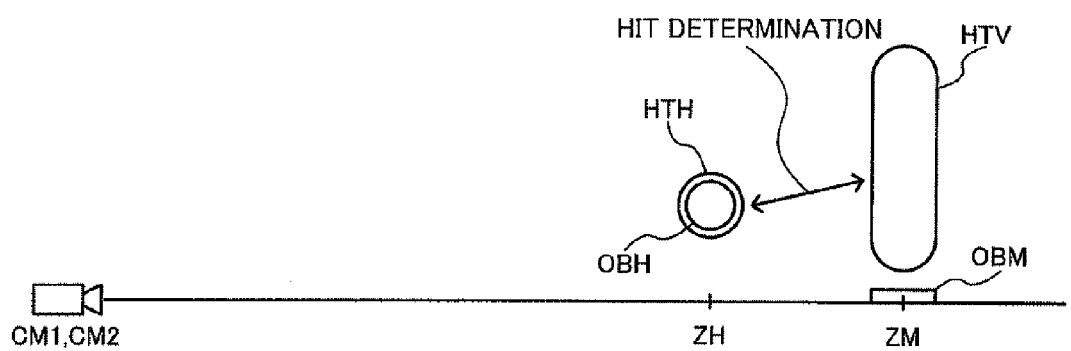
FIG. 9 is a view illustrating a method that performs a hit determination process using a hit volume that is set using depth information.

A specific example of the hit determination process is described below. In FIG. 9, a hit volume HTV for the virtual object is set based on the depth information about the placement position determination marker OBM, and the hit determination process is performed on the photographic object (e.g., hand OBH) and the virtual object OBV using the hit volume HTV.

Specifically, the depth value ZM of the marker OBM is detected as the depth information in FIG. 9. In this case, the hit volume HTV for the virtual object is set at a position corresponding to the depth value ZM. The size and the shape of the hit volume HTV may be set corresponding to the size and the shape of the virtual object OBV that appears corresponding to the pattern of the marker OBM, for example. For example, the size of the hit volume HTV may be increased when causing a large virtual object OBV to appear, and may be decreased when causing a small virtual object OBV to appear. The shape of the hit volume HTV may be changed between a case where the virtual object OBV in an upright state (shape) is caused to appear and a case where the virtual object OBV in a sitting state is caused to appear.

In FIG. 9, the depth value ZH of the hand OBH is detected as the depth information, and a hand (object) hit volume HTH is set at a position corresponding to the depth value ZH. The hit determination process that determines whether or not the hit volume HTV overlaps the hit volume HTH is performed. When it has been determined that the hit volume HTV overlaps the hit volume HTH, it is determined that the hand OBH has hit the virtual object OBV, and the display state change process or the sound output process is performed (see FIGS. 8A and 8B).

A more accurate hit determination process can be implemented by setting the hit volume corresponding to the depth value of the virtual object, and performing the hit determination process, so that the degree of augmented reality can be further improved.

According to one embodiment of the invention, the hit determination process is performed on the photographic object (e.g., hand) and the virtual object based on the acquired depth information. This makes it possible to allow the user to have an impression that an actual object is displayed within the captured image as the virtual object. Specifically, since the virtual object reacts (see FIGS. 8A and 8B) when the user has touched the virtual object, the reality of the virtual object is enhanced, so that the degree of augmented reality can be improved.

Note that the display state change method and the sound output method employed when the photographic object has hit the virtual object are not limited to the methods described with reference to FIGS. 8A and 8B. For example, the display state may be changed in a different way, or a different sound may be output corresponding to the hit position of the photographic object with the virtual object. Specifically, a first animation process (e.g., a first motion process that causes the virtual object to raise one hand) may be performed on the virtual object when the hand or the like has hit a first part (e.g., head) of the virtual object, and a second animation process (e.g., a second motion process that causes the virtual object to raise both hands) may be performed on the virtual object when the hand or the like has hit a second part (e.g., trunk) of the virtual object. The virtual object may be caused to produce (output) a first-pattern sound (e.g., "Thanks") when the hand or the like has hit the first part of the virtual object, and may be caused to produce (output) a second-pattern sound (e.g., "Hi") when the hand or the like has hit the second part of the virtual object.

The hit determination method is not limited to the method described with reference to FIG. 9. For example, the hit volume may not be set corresponding to the photographic object (e.g., hand), and the hit determination process may be performed using a representative position of the photographic object and the hit volume that is set corresponding to the virtual object. Alternatively, the hit determination process may be performed using a representative position of the virtual object and a representative position of the photographic object without using the hit volume. When setting the hit volume corresponding to the photographic object, the hit volume may be set based on a plurality of depth values acquired corresponding to the photographic object instead of using the single depth value ZH (see FIG. 9). Specifically, when a depth image as shown in FIG. 14B (described later) is acquired, the hit volume corresponding to the photographic object (e.g., hand) may be set using the depth value of the depth image.

2.4 Movement Process

A movement process may be performed on the virtual object based on the acquired depth information. Specifically, the virtual object is moved between the position of the marker and the position of the photographic object based on the depth information about the placement position determination marker and the depth information about the photographic object.

Figure 10A:
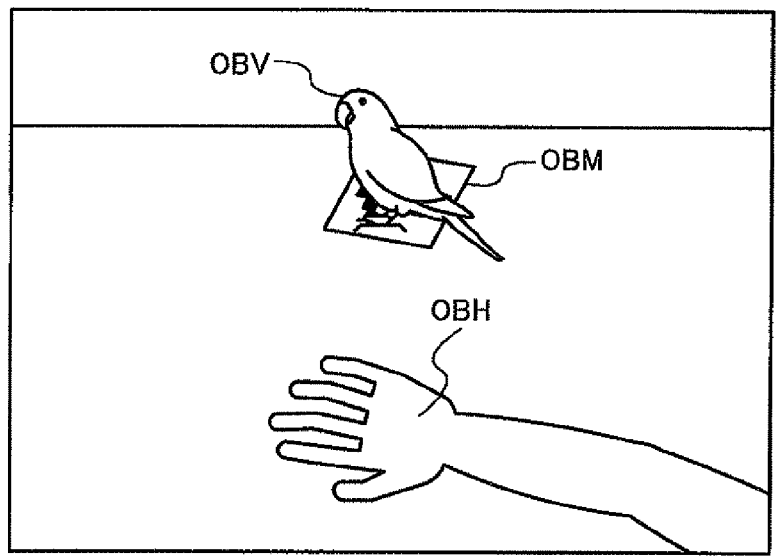
FIGS. 10A and 10B are views illustrating a method that moves a virtual object using depth information.

In FIG. 10A, a bird virtual object OBV is caused to appear corresponding to the pattern of the placement position determination marker OBM. When it has been detected that the hand OBH of the user is positioned in front of the bird virtual object OBV, a movement process that causes the virtual object OBV to fly toward the hand OBH of the user and perch on the hand OBH is performed. This makes it possible to allow the user to have an impression that the virtual object OBV is a live bird, so that the degree of augmented reality can be improved.

A specific example of the movement process is described below with reference to FIG. 11. In FIG. 11, the depth value ZM of the placement position determination marker OBM is detected as the depth information. The depth value ZH of the hand OBH (i.e., object) is also detected as the depth information. In this case, a trajectory TR shown in FIG. 11 is set based on the depth values ZM and ZH, and the virtual object OBV is moved along the trajectory. This makes it possible to generate an image in which the virtual object OBV jumps onto the hand OBH of the user (see FIG. 10B).

Therefore, the movement process can be performed on the virtual object OBV by effectively utilizing the detected depth values ZM and ZH, so that advanced augmented reality can be implemented with a reduced processing load.

Figure 10B:
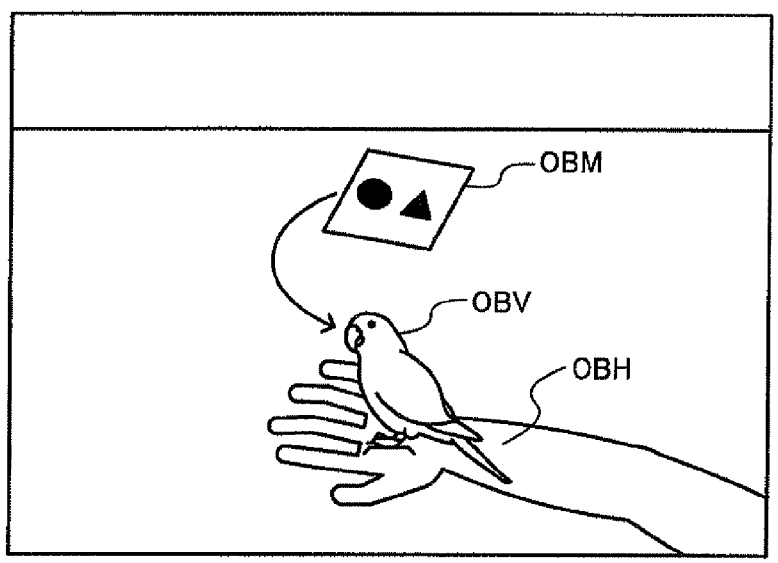
Figure 11:
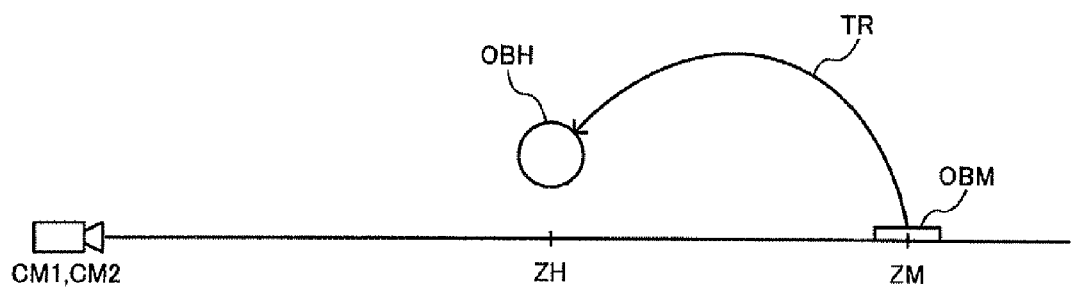
FIG. 11 is a view illustrating a method that moves a virtual object using depth information.

Note that the virtual object OBV may be moved from the position of the hand OBH of the user to the position of the marker OBM, differing from FIGS. 10A and 10B. The trajectory TR may be changed corresponding to the type of the virtual object OBV that is caused to appear. Alternatively, the movement (e.g., trajectory) of the virtual object OBV may be changed corresponding to the shape and the like of the photographic object that has been detected to be positioned on the front side of the marker OBM.

The image generation process based on the movement process may be implemented using a still image, or may be implemented using a movie. When implementing the image generation process based on the movement process using a still image, a still image as shown in FIG. 10A and a still image as shown in FIG. 10B are generated when it has been detected that the hand OBH is positioned on the front side of the marker OBM based on the depth information about the captured image. When implementing the image generation process based on the movement process using a movie, images of a movie in which the virtual object OBV moves from the position shown in FIG. 10A to the position shown in FIG. 10B is generated, and displayed on the main display section 190M shown in FIG. 4, for example.

2.5 Acquisition of Depth Information

A specific depth information acquisition method is described below.

Figure 2B:
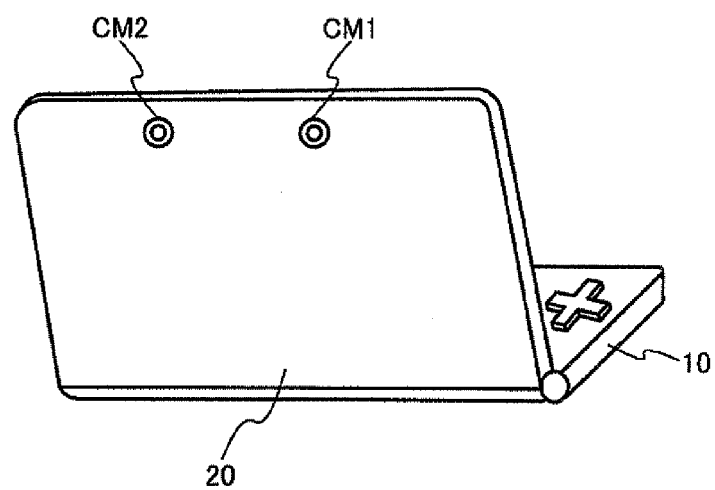
Figure 12A:
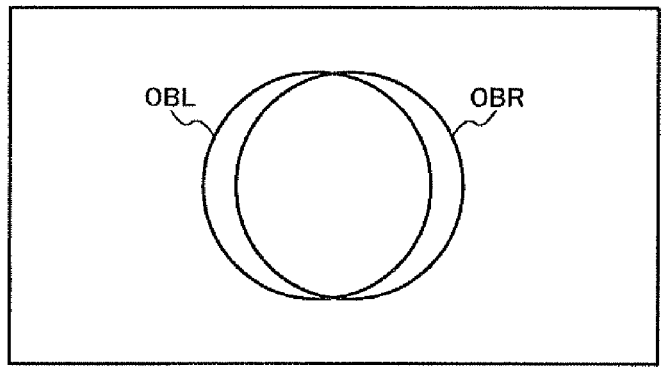
FIGS. 12A to 12C are views illustrating a method that acquires depth information from parallax information about a left-eye image and a right-eye image.
Figure 12B:
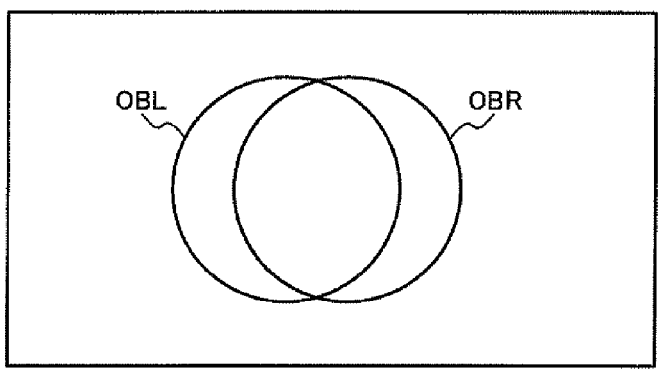
Figure 12C:
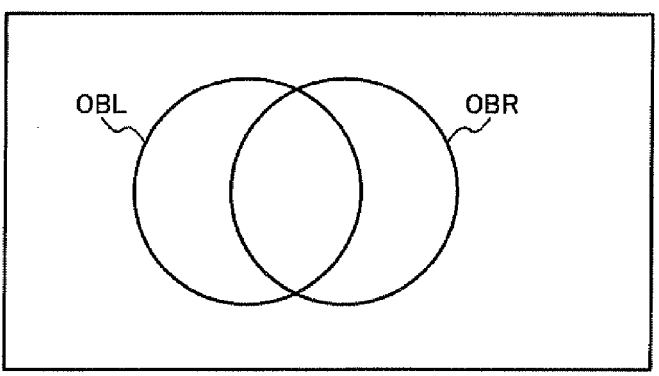

In one embodiment of the invention, the depth information is acquired based on parallax information (difference in display position of an identical object or horizontal parallax) about images acquired by the first camera CM1 and the second camera CM2 shown in FIG. 2B, for example. Specifically, an image captured by the first camera CM1 is acquired as the left-eye image, and an image captured by the second camera CM2 is acquired as the right-eye image. As shown in FIGS. 12A to 12C, the depth information is acquired based on the parallax information obtained from the left-eye image and the right-eye image.

In FIG. 12A, reference symbol OBL indicates an image of the photographic object displayed within the left-eye image, and reference symbol OBR indicates an image of the same object displayed within the right-eye image. In FIG. 12A, since the parallax (difference in display position due to parallax) between the photographic object image OBL and the photographic object image OBR is small, the depth value of the photographic object viewed from the cameras CM1 and CM2 is determined to be small. In FIG. 12B, since the parallax between the photographic object image OBL and the photographic object image OBR is medium, the depth value of the photographic object is determined to be medium. In FIG. 12C, since the parallax (difference in display position due to parallax) between the photographic object image OBL and the photographic object image OBR is large, the depth value of the photographic object is determined to be large.

The depth information about the photographic object observed within the captured image can thus be acquired based on the parallax information (information about the difference in display position of an identical object) about the images acquired by the first camera CM1 and the second camera CM2. Therefore, the depth value ZH of the hand OBH and the depth value ZM of the marker OBM can be acquired by detecting the parallax information about the hand OBH and the marker OBM, and the synthesis process, the hit determination process, and the movement process on the virtual object OBV (see FIGS. 6A to 11) can be implemented by utilizing the depth values ZH and ZM.

Moreover, a stereoscopic image can be generated by capturing the left-eye image and the right-eye image using the cameras CM1 and CM2. Therefore, the images shown in FIGS. 6A, 8A, 8B, 10A, and 10B can be generated as a stereoscopic image, so that advanced augmented reality and stereoscopic representation can be implemented in combination.

Figure 13:
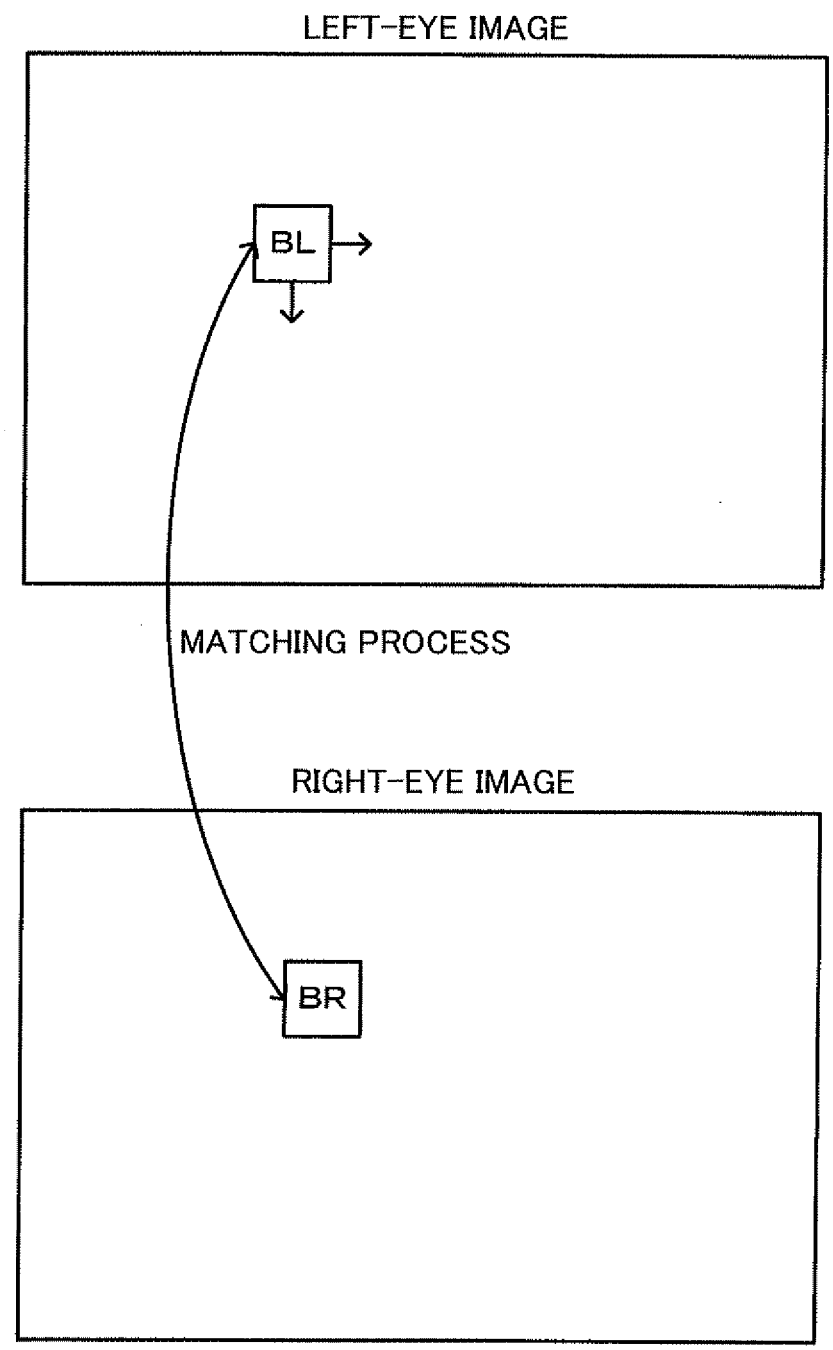
FIG. 13 is a view illustrating a method that acquires parallax information about a left-eye image and a right-eye image.

Note that the parallax information may be detected by a method shown in FIG. 13, for example. In FIG. 13, a matching process is performed on a block image BR included in a right-eye image of the depth information acquisition target object and a block image BL included in a left-eye image of the depth information acquisition target object. When it has been determined that the block image BR included in the right-eye image and the block image BL included in the left-eye image match up, the difference between the X-coordinate of the position of the block image BR and the X-coordinate of the position of the block image BL is acquired as the parallax information, for example. The depth information is calculated from the acquired parallax information using a given conversion equation or the like, and the depth information about the photographic object (e.g., marker or hand) is acquired. This makes it possible to acquire the depth information about the photographic object by a simple process utilizing the matching process.

The depth information need not necessarily be acquired based on the parallax information, but may be acquired by various other methods. For example, when the imaging section 150 includes a depth camera, the depth information may be acquired based on a depth image captured by the depth camera (depth sensor).

Figure 14A:
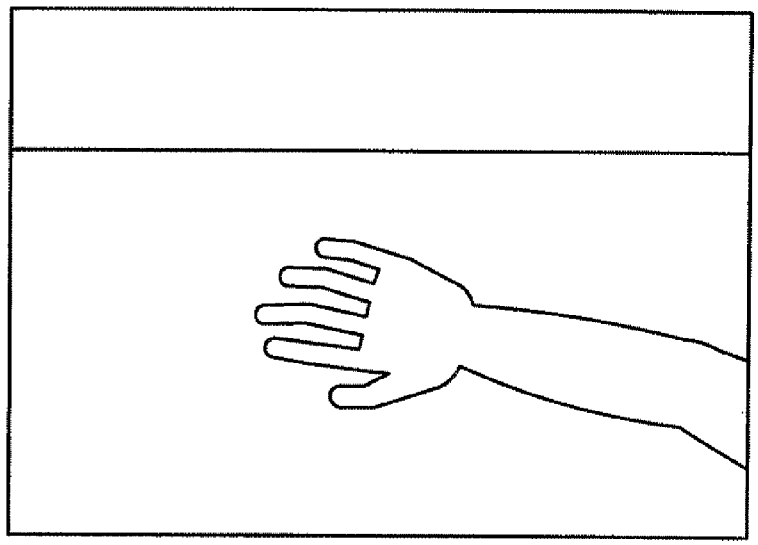
FIGS. 14A and 14B are views illustrating a method that acquires depth information from a depth image captured by a depth camera.
Figure 14B:

FIGS. 14A and 14B show examples of a color image captured by a color image camera and a depth image captured by a depth camera. The color image camera is implemented by an RGB sensor (e.g., CCD or CMOS sensor), and the depth camera is implemented by an infrared sensor or the like. For example, the color image camera is provided at the position of the camera CM1 shown in FIG. 2B, and the depth camera is provided at the position of the camera CM2.

A color image as shown in FIG. 14A is captured by the color image camera, and a depth image as shown in FIG. 14B is captured by the depth camera. For example, color information about the photographic object and its surroundings is obtained from the color image. The depth values of the photographic object and its surroundings are obtained from the depth image as grayscale values, for example. The color image is an image in which the color value (RGB) is set to each pixel position, and the depth image is an image in which the depth value is set to each pixel position, for example.

The depth information may be acquired by a known method. For example, the depth information is acquired by emitting light (e.g., infrared radiation) from the depth camera, and detecting the reflection intensity or the time of flight of the emitted light to detect the shape of the photographic object viewed from the position of the depth camera. Specifically, the depth information is indicated by grayscale data (e.g., a photographic object positioned near the depth camera is bright, and a photographic object positioned away from the depth camera is dark). Alternatively, the depth information (depth distance) is acquired based on moire fringes due to an infrared laser (i.e., depth camera).

The depth information may be acquired by various other methods. For example, the depth information may be acquired using a distance sensor (ranging sensor) or the like that utilizes ultrasonic waves.

2.6 Specific Processing Example

A specific processing example according to one embodiment of the invention is described below with reference to flowcharts shown in FIGS. 15 to 17.

Figure 15:
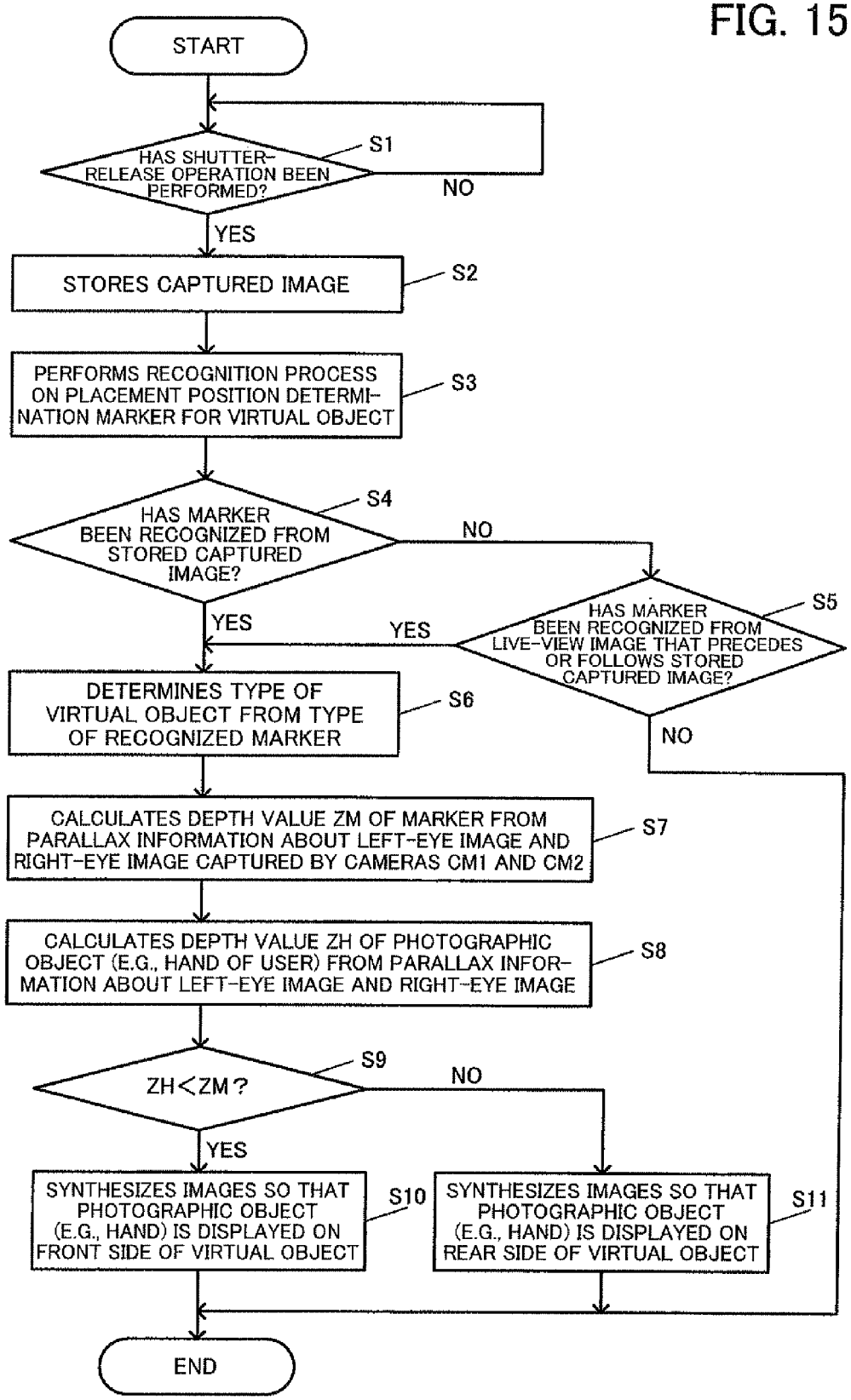
FIG. 15 is a flowchart illustrating a specific process according to one embodiment of the invention.

FIG. 15 is a flowchart illustrating the virtual object synthesis process based on the depth information.

First, whether or not a shutter-release operation has been performed is determined (step S1). The shutter-release operation is performed by pressing the operation button 16 (see FIG. 2A), for example. When the shutter-release operation has been performed, the captured image captured at the timing when the shutter-release operation has been performed is stored (step S2). The recognition process is then performed on the virtual object placement position determination marker (step S3). For example, the recognition process is implemented by performing a matching process with a template pattern.

Whether or not a marker (i.e., the pattern of a marker) has been recognized from the stored captured image is determined (step S4). When a marker has not been recognized, whether or not a marker has been recognized from a live-view image that precedes or follows the stored captured image is determined (see FIG. 7A to 7D) (step S5). When a marker has been recognized in the step S4 or S5, the type of virtual object is determined from the type of the recognized marker (step S6). For example, a first virtual object is caused to appear when the marker is a first-type marker, and a second virtual object is caused to appear when the marker is a second-type marker.

The depth value ZM of the marker is calculated from the parallax information about the left-eye image and the right-eye image captured by the cameras CM1 and CM2 (see FIG. 2B), as described with reference to FIGS. 12A to 12C (step S7). The depth value ZH of the photographic object (e.g., the hand of the user) is also calculated from the parallax information about the left-eye image and the right-eye image (step S8).

Whether or not the depth value ZH is smaller than the depth value ZM is then determined (step S9). When the depth value ZH is smaller than the depth value ZM, the images are synthesized so that the photographic object (e.g., hand) is displayed on the front side of the virtual object (see FIG. 6A) (step S10). When the depth value ZH is equal to or larger than the depth value ZM, the images are synthesized so that the photographic object (e.g., hand) is displayed on the rear side of the virtual object (see FIG. 5) (step S11).

Figure 16:
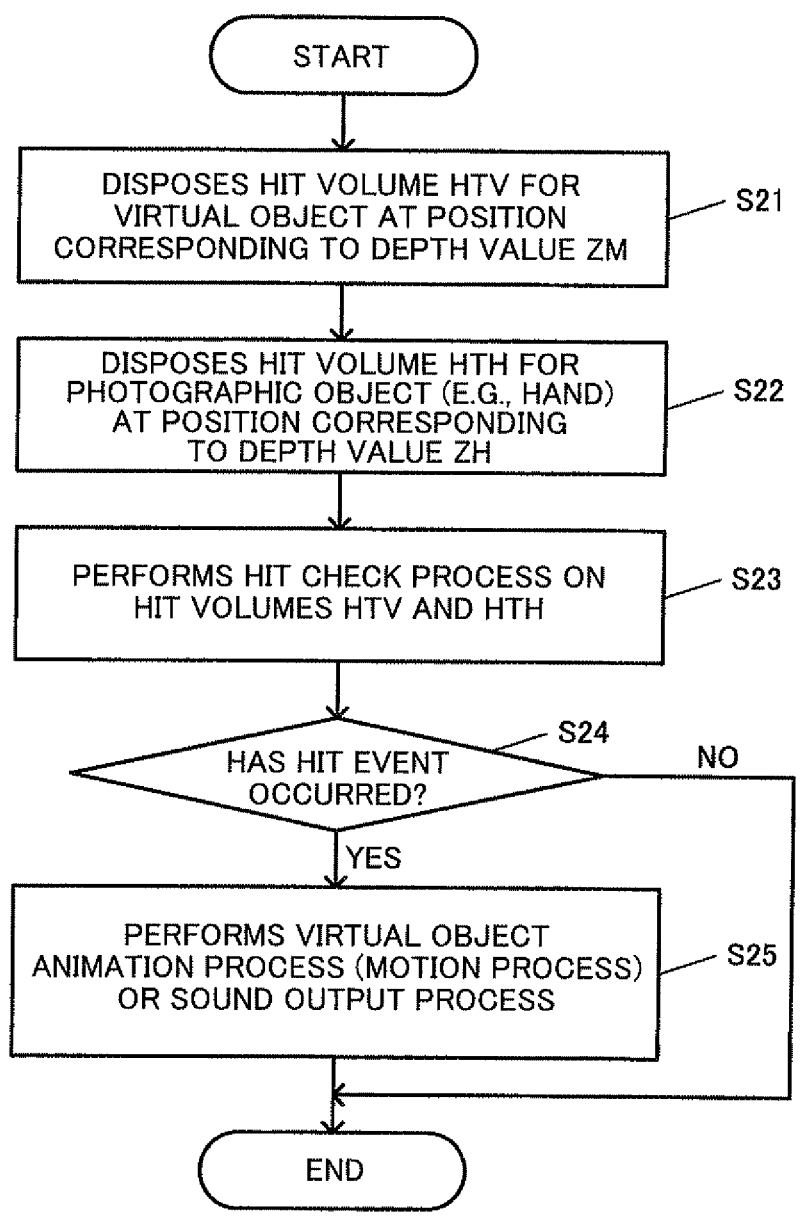
FIG. 16 is a flowchart illustrating a specific process according to one embodiment of the invention.

FIG. 16 is a flowchart illustrating the hit determination process performed on the photographic object (e.g., hand) and the virtual object.

When the depth value ZM of the marker has been acquired, the hit volume HTV for the virtual object is disposed at a position corresponding to the depth value ZM, as described with reference to FIG. 9 (step S21). When the depth value ZH of the photographic object (e.g., hand) has been acquired, the hit volume HTH for the photographic object (e.g., hand) is disposed at a position corresponding to the depth value ZH (step S22). A hit check process is then performed on the hit volumes HTV and HTH (step S23). Specifically, whether or not the hit volume HTV overlaps the hit volume HTH is determined. When it has been determined that the hit event has occurred (step S24), the virtual object animation process (motion process) or the sound output process is performed, as described with reference to FIGS. 8A and 8B (step S25). For example, the animation process or the sound output process corresponding to the hit position is performed.

FIG. 17 is a flowchart illustrating the virtual object movement process based on the depth information.

Note that steps S31 to S38 in FIG. 17 are the same as the steps S1 to S8 in FIG. 15. When the depth value ZM of the marker and the depth value ZH of the photographic object (e.g., the hand of the user) have been acquired in the steps S37 and S38 in FIG. 17, an image in which the virtual object moves from the position corresponding to the depth value ZM to the position corresponding to the depth value ZH is generated (synthesized) (step S39). For example, an image in which the virtual object moves along the trajectory TR (see FIG. 11) specified by the depth values ZM and ZH is generated (synthesized). Images shown in FIGS. 10A and 10B can thus be generated.

Although some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g., hand or placement position determination marker) cited with a different term (e.g., object or placement position determination photographic object) having a broader meaning or the same meaning at least once in the specification and the drawings can be replaced by the different term in any place in the specification and the drawings. The depth information acquisition process, the virtual object synthesis process based on the depth information, the hit determination process based on the depth information, the virtual object movement process based on the depth information, and the like are not limited to those described in connection with the embodiments. Methods equivalent to these methods are included within the scope of the invention. The invention may be applied to various image generation systems such as a portable game device, a consumer game device, an arcade game device, a mobile phone, and a portable information terminal.

What is claimed is:

1. An image generation system comprising:
    a captured image acquisition section that acquires a captured image captured by an imaging section;
    a captured image storage section that stores image data about a plurality of live-view images captured by the imaging section;
    a depth information acquisition section that acquires depth information about a photographic object observed within the captured image, and depth information about a placement position determination photographic object for determining a placement position of a virtual object based on the plurality of live-view images;
    an object processing section that performs a process that:
        determines a positional relationship between the photographic object and the virtual object in a depth direction based on the acquired depth information about the photographic object and the depth information about the placement position determination photographic object acquired from the plurality of live-view images, and
        synthesizes the virtual object with the captured image based on the determined positional relationship by generating an image in which the virtual object is synthesized with the captured image such that the photographic object is displayed on a front side of the virtual object, when it has been determined that the photographic object is positioned on the front side of the virtual object in the depth direction; and
    an image generation section that generates an image in which the virtual object is synthesized with the captured image, wherein
        the synthesizing of the virtual object with the captured image comprises performing hidden surface removal of the virtual object and translucent blending, and
        the hidden surface removal removes hidden surfaces of the virtual object from the display when a physical object is in front of the virtual object.

2. The image generation system as defined in claim 1,
    the depth information acquisition section acquiring the depth information about the placement position determination photographic object based on a live-view image among the plurality of live-view images, in which it has been determined that a placement position determination area of the placement position determination photographic object is not hidden behind the photographic object.

3. The image generation system as defined in claim 1, wherein the object processing section further performs a hit determination process on the photographic object and the virtual object based on the depth information.

4. The image generation system as defined in claim 3, wherein the object processing section:
    sets a hit volume for the virtual object based on the depth information about the placement position determination photographic object for determining the placement position of the virtual object, and performs the hit determination process on the photographic object and the virtual object using the set hit volume.

5. The image generation system as defined in claim 3,
    the object processing section further performing at least one of a process that changes a display state of the virtual object and a process that outputs sound corresponding to the virtual object when it has been determined that the photographic object has hit the virtual object by the hit determination process.

6. The image generation system as defined in claim 1,
    the object processing section further performing a movement process of the virtual object based on the depth information.

7. The image generation system as defined in claim 6, wherein the object processing section moves the virtual object between a position of the placement position determination photographic object for determining the placement position of the virtual object and a position of the photographic object based on the depth information about the placement position determination photographic object and the depth information about the photographic object.

8. The image generation system as defined in claim 1,
    the captured image acquisition section acquiring a first captured image captured by a first camera included in the imaging section as a left-eye image, and acquiring a second captured image captured by a second camera included in the imaging section as a right-eye image, and
    the depth information acquisition section acquiring the depth information based on parallax information obtained from the left-eye image and the right-eye image.

9. The image generation system as defined in claim 8, wherein the image generation section generates the image in which the virtual object is synthesized with a stereoscopic image generated using the left-eye image and the right-eye image.

10. The image generation system as defined in claim 1,
    the captured image acquisition section acquiring a depth image from a depth camera included in the imaging section, and
    the depth information acquisition section acquiring the depth information based on the depth image.

11. An image generation method comprising:
    acquiring a captured image captured by an imaging section;
    storing image data about a plurality of live-view images captured by the imaging section;
    acquiring depth information about a photographic object observed within the captured image, and depth information about a placement position determination photographic object for determining a placement position of a virtual object based on the plurality of live-view images;
    performing a process that determines a positional relationship between the photographic object and the virtual object in a depth direction based on the acquired depth information about the photographic object and the depth information about the placement position determination photographic object acquired from the plurality of live-view images; and
    synthesizing the virtual object with the captured image based on the determined positional relationship by generating an image in which the virtual object is synthesized with the captured image such that the photographic object is displayed on a front side of the virtual object, when it has been determined that the photographic object is positioned on the front side of the virtual object in the depth direction;

wherein
the synthesizing of the virtual object with the captured image comprises performing hidden surface removal of the virtual object and translucent blending, and
the hidden surface removal removes hidden surfaces of the virtual object from the display when a physical object is in front of the virtual object.

12. The image generation method as defined in claim 11, further comprising: acquiring the depth information about the placement position determination photographic object based on a live-view image among the plurality of live-view images, the live-view image being a live-view image in which it has been determined that a placement position determination area of the placement position determination photographic object is not hidden behind the photographic object.

13. A non-transitory computer-readable information storage medium storing a program that causes a computer to execute the image generation method as defined in claim 11.

14. The image generation system of claim 1, wherein the positional relationship in the depth direction is a relationship that indicates whether the photographic object is positioned on the front side, the rear side, or overlaps the virtual object when viewed from the imaging section.

15. The image generation system of claim 1, further comprising a translucent blending section that blends an area where the photographic object overlaps the virtual object, when an area of the photographic object overlaps an area of the virtual object.

16. The image generation system of claim 1, wherein the virtual object is one of: a human, an animal, a robot, a car, a ship, or an airplane.

17. The image generation method of claim 11, wherein the object processing section performs a movement process on the virtual object based on the depth information.

18. The image generation method of claim 11, wherein
the object processing section comprises a hit determination process that determines whether a physical object has hit the virtual object, and
when a physical object has hit the virtual object, the object processing section performs at least one of changing a display state of the virtual object and outputting a sound corresponding to the virtual object.

* * * * *